Aug. 9, 1960 F. B. RECKER 2,948,559

COUPLINGS

Filed Aug. 21, 1958 2 Sheets-Sheet 1

INVENTOR.
FLORIAN B. RECKER
BY
Corey & Corey
ATTORNEYS

INVENTOR.
FLORIAN B. RECKER
BY
Corey & Corey
Atty's

United States Patent Office 2,948,559

Patented Aug. 9, 1960

1

2,948,559

COUPLINGS

Florian B. Recker, Hopkinton, Iowa

Filed Aug. 21, 1958, Ser. No. 756,346

6 Claims. (Cl. 287—119)

This invention relates to couplings for transmitting power and has particular relation to couplings, usually of the universal type, in which connection between driving and driven members is made by a shaft, usually splined, which is slidably or telescopically received in a collar or tube having matching splines or keyways.

In the transmission of power where sliding connections between driving and driven means are employed, and particularly where universal joints are required in order to take care of misalignment, there is a constant danger that the splined shaft will be withdrawn from the splined tube and injury to the operator and machinery result.

While means have been proposed for locking splined shafts into collars, these usually employ various types of bolts which have to be drawn down and which constitute a knob or projection, which may catch in the clothing of the operator and wrap it about the shaft to the injury of the operator.

In using machinery, particularly farm machinery, the operator may frequently oil or clear or adjust the driven machine, and it is usually customary to permit the driven machine to continue to rotate during adjustment or oiling because of the trouble and difficulty of disconnecting the drive shaft.

It is among the objects of my invention, therefore, to provide means for positively locking telescopic drive shafts together so that they cannot inadvertently slide apart and become disconnected, but so constituted that a mere twist of the operating device of the locking means will apply or disengage the locking means.

Another object of my invention is to provide means of the above character in which no projecting knob or protuberance is used which would endanger the operator.

Still another object of the invention is to provide a locking means which is quickly and readily operable without the necessity of unscrewing bolts or nuts or other devices of that character and in which disconnecting and connecting may be effected by the simple rotation of a collar or the like.

Other and further features and objects of the invention will be more apparent to those skilled in the art upon a consideration of the accompanying drawings and following specifications, wherein are disclosed exemplary embodiments of the invention, with the understanding, however, that such changes may be made therein as fall within the scope of the appended claims, without departing from the spirit of the invention.

2

Figure 4:
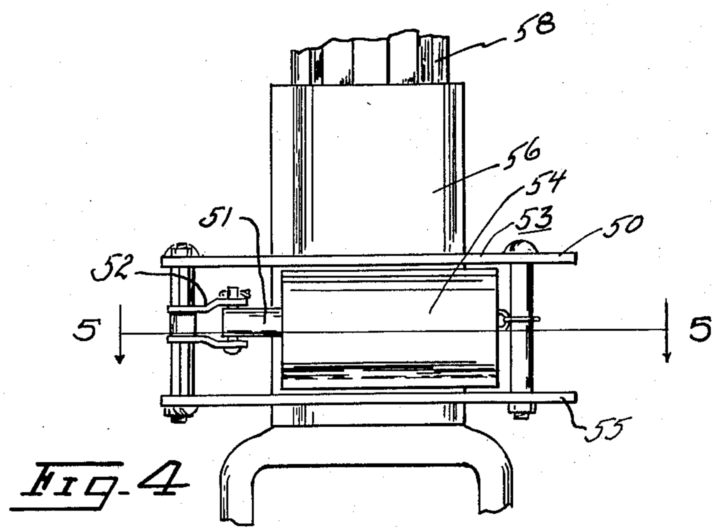

Figure 4 is a view in elevation of another embodiment of my locking means, and

Figure 5:
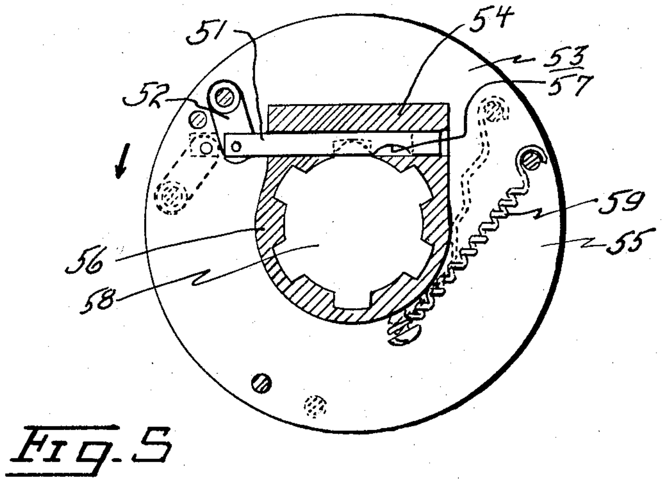

Figure 5 is a view in section taken along the line 5—5 of Figure 4.

Referring then to the drawings:

The member 10 is one portion of a conventional universal joint, as illustrated at 11, which includes a pair of yokes 10 and 12 and the cross 13, conventional bearings being provided at the four ends of the crosses, as indicated at 14, for transmitting torque to the yoke member 12, assuming that power is applied to the yoke 10. The yoke 12 is provided with a collar or tube 16 having internal splines, as indicated at 17, for the reception of the splined end 18 of the shaft and engaging means, which is shown at 19, and this is all in accordance with conventional construction.

Figure 1:
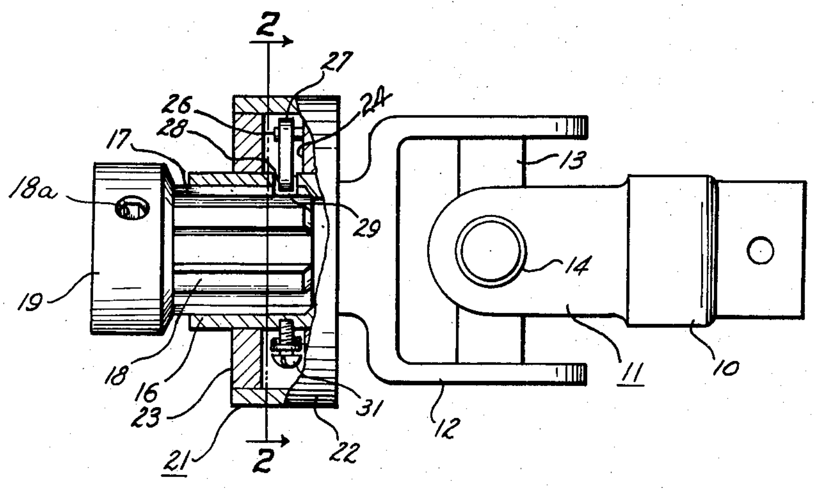
Figure 1 is a view, partly in elevation and partly in section of a locking or engaging means constructed according to one embodiment of my invention.
Figure 2:
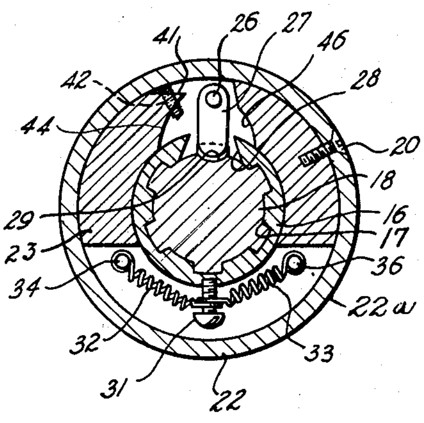
Figure 2 is a view in section taken along the line 2—2 of Figure 1, showing the locking means as it appears in the engaged position.
Figure 3:
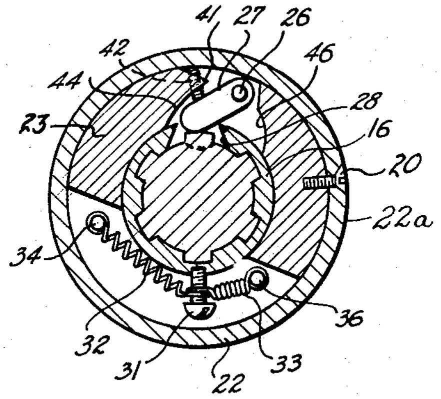
Figure 3 is a view corresponding to Figure 2, but illustrating the device as it appears in the disengaged position.

In practicing my invention, however, I provide a two-part disc, indicated at 21, adapted to surround the tube or collar 16. This disc includes a cup-shaped member 22 and a disc or washer 23 adapted to surround the shaft 16 and be received within the peripheral walls of the cup 22 and to be rotatably engaged therein so that the cup 22 may rotate with reference to the tube 16. The inner side wall 24 of the cup 22 carries a pin 26 on which a locking latch or lever 27 is pivotally engaged. The wall of the sleeve or tube 16 at 28 is provided with a slot, better shown in Figures 2 and 3, through which the free end of the ear 27 projects. The cup member 22 is preferably in two parts a sleeve or outer housing 22*b* and the disc 23 which are fastened together by a screw 20 for ready disassembly.

The splined end of the shaft 18 is provided with a notch, indicated at 29, for receiving the end of the lever 27, and the notch and the corresponding end of the lever 27 are preferably rounded, as illustrated, for easy entry and removal of the end of the lever.

The opposite side of the splined shaft 18 is provided with a tapped opening 18*a* to receive a screw 31, and springs 32 and 33 are engaged to the two pins 34 and 36 on the inner side wall 24 of the cup 22 at a position opposite to the pin 26. The springs 32 and 33 tend normally to hold the cup in the engaged position shown in Figure 2, with the ear or lever 27 engaged within the slot 29 of the shaft 18, and thus the shaft is prevented from being withdrawn from engagement within the sleeve 16 under normal conditions.

However, if the operator wishes to disengage the shaft 18 from the sleeve 16, he has only to rotate the cup 22 in either direction and the ear 27 will be rotated by reason of relative movement of the pin 26 to withdraw the lever 27 from engagement within the slot, and thus permit the shaft to be withdrawn. Note that the bevel face 28 of the slot in the sleeve 16 forces the lever 27 out of engagement with the shaft 18 and that the springs 32 and 33 are now unequally stressed so that releasing of the cup 22 will permit the cup to be pulled back to the position shown in Figure 2—that is, the engaging position.

The small spring 41 is so positioned within the bore 42 within the cup 22 that it will assist in biasing the lever 27 to the engaged position, but this spring is not absolutely necessary to the operation.

It is to be noted that when the lever 27 is disengaged, the free end is received within the hollowed-out portion of the chamber illustrated at 44. In the present instance, a hollowed-out portion 46 is provided for reception of the latch 27 if it is rotated in the opposite direction, but if one or the other of these recesses 44 or 46 is not provided in the chamber 44, the lever may be prevented from rotating in one or the other direction to make the locking device unidirectional in action.

In the form of the invention shown in Figures 4 and 5, the equivalent of a removable latch or lever is employed, but the lever is in the form of a pin 51 which is retracted with a tangential movement of translation instead of a swinging movement, the swinging movement being supplied by the link 52 which is engaged at one end to the cup or cage 53 and at the other to the locking pin 51.

The cage in this embodiment is formed of two discs 50 and 55.

The pin 51 is received for reciprocation in a boss 54 on the internally splined tube 56, and is provided with a recess 57 which will permit withdrawal of the externally splined shaft 58 when the pin is withdrawn by link 52 to the dotted line position shown in Figure 5.

Withdrawal of the pin is effected by rotation of the cage 53 to the dotted line position. The cage is preferably rotated to the engaged position by a spring 59.

Although I have described specific embodiments of my invention, it is apparent that modifications thereof may be made by those skilled in the art. Such modifications may be made without departing from the spirit and scope of my invention as set forth in the appended claims.

I claim as my invention:

1. In a telescoping coupling, including tube and shaft members, a cup-like member adapted to surround one of the members and rotatable with respect thereto, a latch pivotally engaged to the cup member and projecting inwardly therefrom, and a sleeve having an opening to receive the latch, the other member likewise having an opening to receive the free end of the latch, and spring means for biasing the cup member to a position such that the latch is engaged within the slots in the members, but arranged so that rotation of the cup will withdraw the latch from engagement to permit removal of the shaft from the tube of the coupling.

2. In a telescoping coupling including tube and shaft members, a cage surrounding the tube and mounted for rotation thereon, a latch pin shiftable longitudinally in recesses in the shaft and tube to insert and withdraw the latch pin to engage and disengage the shaft to the tube, and a link for connecting the cage to the end of the latch pin, whereby rotation of the cage in one direction actuates the link to withdraw the latch pin and rotation in the other permits the latch pin to enter the recesses to engage the shaft within the tube.

3. In a telescoping coupling including a tube having a shaft slidably received therein, means for locking the shaft within the tube comprising a cup member positioned to surround the tube and adapted to rotate in relation thereto, a latch lever mounted in said cup member and adapted to move in the same radial plane, a slot in the tube to receive the latch pin, a recess in the shaft aligned with said slot to receive the radially movable latch pin, spring biasing means interconnecting said cup member and said tube and adapted to permit the surrounding cup member to be moved to a predetermined radial position such that the latch pin will be withdrawn through said tube slot from engagement in said shaft recess.

4. In a telescoping coupling including a tube and a splined shaft slidably received within the tube, one of the lands of said splined shaft having a notch therein, a cup member mounted on the tube and adapted to limited rotatable movement in relation thereto, a slot in the tube in alignment with said shaft notch, means for engaging the shaft within the tube to limit relative longitudinal movement, said means comprising a latch mounted in said rotatably mounted cup member and having a plane of rotation such that the free end of the latch may, in one position, extend through said slot in said tube and engage the aforesaid notch provided in the land of said shaft.

5. In a telescopic coupling including a tube and a shaft having a notch therein and being slidably received within the tube, a slot in said tube, a cup member, rotatably mounted on said tube, means for engaging the shaft within the tube to limit relative longitudinal movement comprising a latch swingably mounted in said cup member and having a radial plane of rotation such that the free end of the latch will normally extend through said tube slot and engage the notch provided in the said shaft, means for biasing the latch in engaged position, said means further being adapted to permit the rotation of said cup to cause the radial withdrawal of said latch from engagement with said notch in said shaft.

6. In a telescopic coupling including a tube and a shaft having a notch therein slidably received within the tube, a slot in the tube, a cup member rotatably mounted on said tube, means for engaging the shaft within the tube to limit relative longitudinal movement, said means comprising a latch swingably mounted in said cup member and having the same plane of rotation as said cup member and so positioned that the free end of the latch will, in one radial position, extend through said slot and engage the notch provided in said shaft, and means for causing the radial rotation of said latch to the engaged position, said means being further adapted to permit the selective radial rotation of said cup, whereby said latch will strike the walls of said slot in said tube and pivot radially thereabout out of engagement with said notch.

References Cited in the file of this patent

UNITED STATES PATENTS

| | | |
|---|---|---|
| 283,745 | Bartlett | Aug. 28, 1883 |
| 767,261 | Byer | Aug. 9, 1904 |
| 799,787 | Gessert | Sept. 19, 1905 |